United States Patent
Holt et al.

(10) Patent No.: US 9,256,598 B1
(45) Date of Patent: Feb. 9, 2016

(54) SYSTEMS, METHODS, AND COMPUTER READABLE MEDIA FOR COPY-ON-DEMAND OPTIMIZATION FOR LARGE WRITES

(75) Inventors: James M. Holt, Raleigh, NC (US);
Robert K. Dewitt, Cary, NC (US);
David Haase, Fuquay Varina, NC (US);
Somnath A. Gulye, Morrisville, NC (US); Saurabh M. Pathak, Cary, NC (US)

(73) Assignee: EMC Corporation, Hopkinton, MA (US)

( * ) Notice: Subject to any disclaimer, the term of this patent is extended or adjusted under 35 U.S.C. 154(b) by 445 days.

(21) Appl. No.: 12/544,046

(22) Filed: Aug. 19, 2009

(51) Int. Cl.
*G06F 17/30* (2006.01)
*G06F 11/00* (2006.01)

(52) U.S. Cl.
CPC ............... *G06F 17/30* (2013.01); *G06F 11/00* (2013.01); *G06F 17/30578* (2013.01)

(58) Field of Classification Search
CPC ............ G06F 17/30578; G06F 17/30575; G06F 17/30067; G06F 12/0804; G06F 12/0875
USPC ................................ 707/609–686; 715/723
See application file for complete search history.

(56) References Cited

U.S. PATENT DOCUMENTS

| | | | |
|---|---|---|---|
| 5,455,932 A | 10/1995 | Major et al. | |
| 5,522,037 A | 5/1996 | Kitagawa et al. | |
| 5,592,618 A | 1/1997 | Micka et al. | |
| 5,742,792 A | 4/1998 | Yanai et al. | |
| 6,532,551 B1 | 3/2003 | Kamei et al. | |
| 6,662,268 B1 | 12/2003 | McBrearty et al. | |
| 6,671,705 B1 * | 12/2003 | Duprey et al. | |

(Continued)

OTHER PUBLICATIONS

Interview Summary for U.S. Appl. No. 11/823,986 (Jul. 30, 2010).

(Continued)

*Primary Examiner* — Hosain Alam
*Assistant Examiner* — Tuan-Khanh Phan
(74) *Attorney, Agent, or Firm* — Jenkins, Wilson, Taylor & Hunt, P.A.

(57) ABSTRACT

Methods, systems, and computer readable media for copy-on-demand optimization for large writes are disclosed. According to one aspect, a method for copy on demand optimization for large writes includes, in a system having a source data storage entity and a destination data storage entity, receiving a write request to write data to a target portion of the source data storage entity, the target portion of the source data storage entity comprising at least one data storage block. The method includes determining whether the source data storage entity and the destination data storage entity are engaged in a backup operation in which data sufficient to synchronize the source data storage entity to the destination data storage entity is copied from the destination data storage entity to the source data storage entity, and if so, determining whether the target portion of the source data storage entity is not yet synchronized to the destination data storage entity. If the target portion of the source data storage entity is not yet synchronized to the destination data storage entity, a copy-on-demand operation is performed to synchronize the target portion of the source data storage entity to the destination data storage entity, where each data storage block within the target portion of the source data storage entity that will be completely overwritten as a result of the write request is not synchronized to the destination data storage entity. The write request to write data to the target portion of the source data storage entity is then processed.

18 Claims, 3 Drawing Sheets

(56) References Cited

U.S. PATENT DOCUMENTS

| | | | |
|---|---|---|---|
| 6,898,681 B2 * | 5/2005 | Young | 711/162 |
| 6,910,111 B1 | 6/2005 | Colgrove et al. | |
| 7,096,331 B1 | 8/2006 | Haase et al. | |
| 7,133,985 B1 * | 11/2006 | Haase et al. | 711/162 |
| 7,188,223 B1 | 3/2007 | Haase et al. | |
| 7,353,351 B1 | 4/2008 | Haase et al. | |
| 7,461,100 B2 | 12/2008 | Spear et al. | |
| 7,539,828 B2 | 5/2009 | Lomnes | |
| 7,596,672 B1 | 9/2009 | Gole et al. | |
| 8,818,936 B1 | 8/2014 | Haase et al. | |
| 2003/0051109 A1 | 3/2003 | Cochran | |
| 2003/0115432 A1 | 6/2003 | Biessener et al. | |
| 2003/0177322 A1 | 9/2003 | Crockett et al. | |
| 2003/0204510 A1 | 10/2003 | Ball et al. | |
| 2004/0030951 A1 | 2/2004 | Armangau | |
| 2004/0148477 A1 | 7/2004 | Cochran | |
| 2004/0260873 A1 | 12/2004 | Watanabe | |
| 2004/0267822 A1 | 12/2004 | Curran et al. | |
| 2006/0075200 A1 | 4/2006 | Satoyama et al. | |
| 2007/0185924 A1 | 8/2007 | Kawamura | |
| 2007/0198612 A1 | 8/2007 | Prahlad et al. | |
| 2007/0288711 A1 | 12/2007 | Chen et al. | |

OTHER PUBLICATIONS

Final Official Action for U.S. Appl. No. 11/823,986 (Mar. 30, 2010).
Non-Final Official Action for U.S. Appl. No. 11/823,986 (Jul. 22, 2009).
Notice of Allowance and Fee(s) Due for U.S. Appl. No. 10/679,726 (Dec. 19, 2007).
Advisory Action for U.S. Appl. No. 10/679,726 (Oct. 17, 2007).
Commonly-assigned, co-pending U.S. Appl. No. 11/823,986 for "Methods, Systems, and Computer Program Products for Processing Read Requests Received During a Protected Restore Operation," (Unpublished, filed Jun. 29, 2007).
Final Official Action for U.S. Appl. No. 10/679,726 (Jun. 4, 2007).
Interview Summary for U.S. Appl. No. 10/679,726 (Nov. 2, 2006).
Non-Final Official Action for U.S. Appl. No. 10/679,726 (Nov. 2, 2006).
Notice of Allowance and Fee(s) Due for U.S. Appl. No. 10/679,662 (Sep. 29, 2006).
Advisory Action for U.S. Appl. No. 10/679,726 (Sep. 19, 2006).
Advisory Action for U.S. Appl. No. 10/679,726 (Aug. 15, 2006).
Interview Summary for U.S. Appl. No. 10/679,662 (Aug. 15, 2006).
Advisory Action for U.S. Appl. No. 10/679,662 (Jul. 3, 2006).
Final Official Action for U.S. Appl. No. 10/679,662 (Apr. 13, 2006).
Final Official Action for U.S. Appl. No. 10/679,726 (Apr. 13, 2006).
Notice of Allowance and Fee(s) Due for U.S. Appl. No. 10/673,722 (Apr. 6, 2006).
Notice of Allowance and Fee(s) Due for U.S. Appl. No. 10/673,864 (Mar. 21, 2006).
Non-Final Official Action for U.S. Appl. No. 10/673,722 (Dec. 2, 2005).
Non-Final Official Action for U.S. Appl. No. 10/679,726 (Oct. 20, 2005).
Non-Final Official Action for U.S. Appl. No. 10/673,864 (Oct. 20, 2005).
Non-Final Official Action for U.S. Appl. No. 10/679,662 (Oct. 7, 2005).
Non-Final Official Action for U.S. Appl. No. 11/823,986 (Jul. 11, 2012).
Notice of Allowance and Fee(s) Due for U.S. Appl. No. 11/823,986 (Apr. 25, 2014).
Applicant-Initiated Interview Summary for U.S. Appl. No. 11/823,986 (Mar. 24, 2014).
Applicant-Initiated Interview Summary for U.S. Appl. No. 11/823,986 (Mar. 20, 2014).
Final Office Action for U.S. Appl. No. 11/823,986 (Jan. 8, 2014).
Applicant-Initiated Interview Summary for U.S. Appl. No. 11/823,986 (Oct. 10, 2013).
Final Office Action for U.S. Appl. No. 11/823,986 (Feb. 11, 2013).
Non-Final Office Action for U.S. Appl. No. 11/823,986 (Jun. 21, 2013).
Applicant-Initiated Interview Summary for U.S. Appl. No. 11/823,986 (Jun. 17, 2013).

* cited by examiner

SYSTEMS, METHODS, AND COMPUTER READABLE MEDIA FOR COPY-ON-DEMAND OPTIMIZATION FOR LARGE WRITES

TECHNICAL FIELD

The subject matter described herein relates to methods and systems for mass data storage. More particularly, the subject matter described herein relates to systems, methods, and computer readable media for copy-on-demand optimization for large writes.

BACKGROUND

It is desirable that data stored on data storage entities, such as disk arrays, be protected against loss due to accidental erasure, malicious removal, or equipment failure. For this reason, data that is stored on data storage entities may be copied to another entity or location for safe-keeping, a process commonly referred to as backing-up the data, or a "backup process". If the backup data is needed, it is copied back to the original data storage entity, a process commonly referred to as recovering or restoring the data, or a "restore process". By convention, a backup process copies data from a source data storage entity ("the source") to a destination storage entity ("the destination"). A restore process copies data from the destination back to the source. If a portion or block of the destination data storage entity contains the same data as the corresponding block in the source, the two blocks are said to be synchronized to each other, or "in sync". If the entire contents of the destination match the corresponding contents of the source, the source and destination are said to be in sync.

The backup process may occur on demand, such as in response to a backup request from a user, or it may occur continually in the background as data is written to the source. For example, any time new data is written to the source, a backup process manager may detect that the data in a particular block or portion of the source has changed, and initiate a request to copy data from the changed block in the source to a corresponding block in the destination.

In this scenario, a potential conflict may occur if the source receives a request for a write to a source block while a restore process is occurring. There are three writes involved: 1) the write of new data to the source; 2) the write of data from the source to the destination that occurs as part of the continual backup process; and 3) the write of data from the destination to the source that occurs as part of the ongoing restore process. The relative order of these three writes will determine whether the source and destination contain the new write data or the previously backed up data. In one example, the new data is written to the source, copied from the source to the destination as part of the continual backup process, and copied from the destination back to the source as part of the restore process. In another example, the new data is written to both the source and destination, and later copied from the destination back to the source as part of the restore process. In both of these examples, the restore process fails to restore the source to the exact state of the destination at the time that the restore request was made, i.e., at the time that the restore process was started. Instead, at the conclusion of the restore process, the source will have the same data as the destination, except for the block that was modified by the write that occurred in the middle of the restore process. This kind of restore, i.e., in which the contents of the destination may be changed while the restore is still in progress, is commonly referred to as an "unprotected restore".

For this reason, some data storage systems support a "protected restore" operation, which is a restore process during which no writes are allowed to the destination and during which reads must return restored data. If a read request is received by the source while a protected restore is executing, a storage manager typically checks to see if the blocks to be read have been restored from the destination yet. If they haven't, the storage manager will either put the desired blocks at the top of the queue of blocks to be copied from destination to source as part of the restore process, or the storage manager will instruct some other process to copy the desired blocks from the destination to the source, so that the read request will return restored data. This process of copying needed blocks is referred to as "copy-on-demand", or COD.

Systems that implement a protected restore are disclosed in the following commonly-assigned U.S. patents, all having the same title of "System and Method for Managing Data Associated with Copying and Replication Procedures in a Data Storage Environment": U.S. Pat. Nos. 7,096,331 and 7,133, 985, both filed on Sep. 29, 2003; and U.S. Pat. No. 7,353,351, filed on Oct. 6, 2003, the disclosures of which are incorporated by reference herein in their entireties.

Conventional systems, however, process a write during a protected restore in the same manner, by first copying the affected blocks from the destination to the source, e.g., performing a COD, and then overwriting the blocks with the new data. When performed in preparation for a write to the source, a conventional copy-on-demand process is inefficient, because it must copy blocks from the destination to the source even though those blocks will be completely overwritten during subsequent the write.

Furthermore, as the capacities of data storage systems increase, the amount of data contained in each block tends to increase, e.g., the block size becomes larger and larger. This causes two problems: first, with the advent of digital multimedia, the size of an average data file that is stored on the data storage system has increased from kilobytes to gigabytes in size; second, block sizes are so large that a single block may contain portions of more than one file. As a result of the first problem, conventional implementations of a write during a protected restore end up needlessly copying enormous amounts of data that will just be overwritten again—a waste of time and resources. As a result of the second problem, special attention must be given to blocks which contain data from more than one file, to make sure that data from one file is not accidently overwritten while writing data for another file in the same block.

Accordingly, in light of these disadvantages associated with conventional implementations of a write during a protected restore, there exists a need for systems, methods, and computer readable media for copy-on-demand optimization for large writes.

SUMMARY

According to one aspect, a method for copy on demand optimization for large writes includes, in a system having a source data storage entity and a destination data storage entity, receiving a write request to write data to a target portion of the source data storage entity, the target portion of the source data storage entity comprising at least one data storage block. The method includes determining whether the source data storage entity and the destination data storage entity are engaged in a backup operation in which data sufficient to synchronize the source data storage entity to the destination data storage entity is copied from the destination data storage entity to the source data storage entity, and if so, determining whether the target portion of the source data storage entity is not yet synchronized to the destination data storage entity. If the target portion of the source data storage entity is not yet synchronized to the destination data storage entity, a copy-on-demand operation is performed to synchronize the target portion of the source data storage entity to the destination data storage entity, where each data storage block within the target portion of the source data storage entity that will be completely overwritten as a result of the write request is not synchronized to the destination data storage entity. The write request to write data to the target portion of the source data storage entity is then processed.

According to one aspect, the subject matter described herein includes a system for copy-on-demand optimization for large writes. The system includes a source data storage entity, a destination data storage entity, and a data storage entity manager (manager) for managing the source and destination data storage entities. The data storage entity manager is configured to receive a write request to write data to a target portion of the source data storage entity, the target portion of the source data storage entity comprising at least one data storage block, and determine whether the source and destination data storage entities are engaged in a restore operation which includes copying data from the destination data storage entity to the source data storage entity sufficient to synchronize the source data storage entity to the destination data storage entity. If so, the manager determines whether the target portion of the source data storage entity has been synchronized to the destination data storage entity. If the manager determines that the target portion of the source data storage entity has not been synchronized to the destination data storage entity, the manager initiates a copy-on-demand operation to synchronize the target portion of the source data storage entity to the destination data storage entity, where each data storage block within the target portion of the source data storage entity that will be completely overwritten as a result of the write request is not synchronized to the destination data storage entity. The write request to write data to the target portion of the source data storage entity is then processed.

The subject matter described herein for copy-on-demand optimization for large writes may be implemented in hardware, software, firmware, or any combination thereof. As such, the terms "function" or "module" as used herein refer to hardware, software, and/or firmware for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

In accordance with the subject matter disclosed herein, systems, methods, and computer readable media are provided for copy-on-demand optimization for large writes.

Reference will now be made in detail to exemplary embodiments of the present invention, examples of which are illustrated in the accompanying drawings. Wherever possible, the same reference numbers will be used throughout the drawings to refer to the same or like parts.

Figure 1:
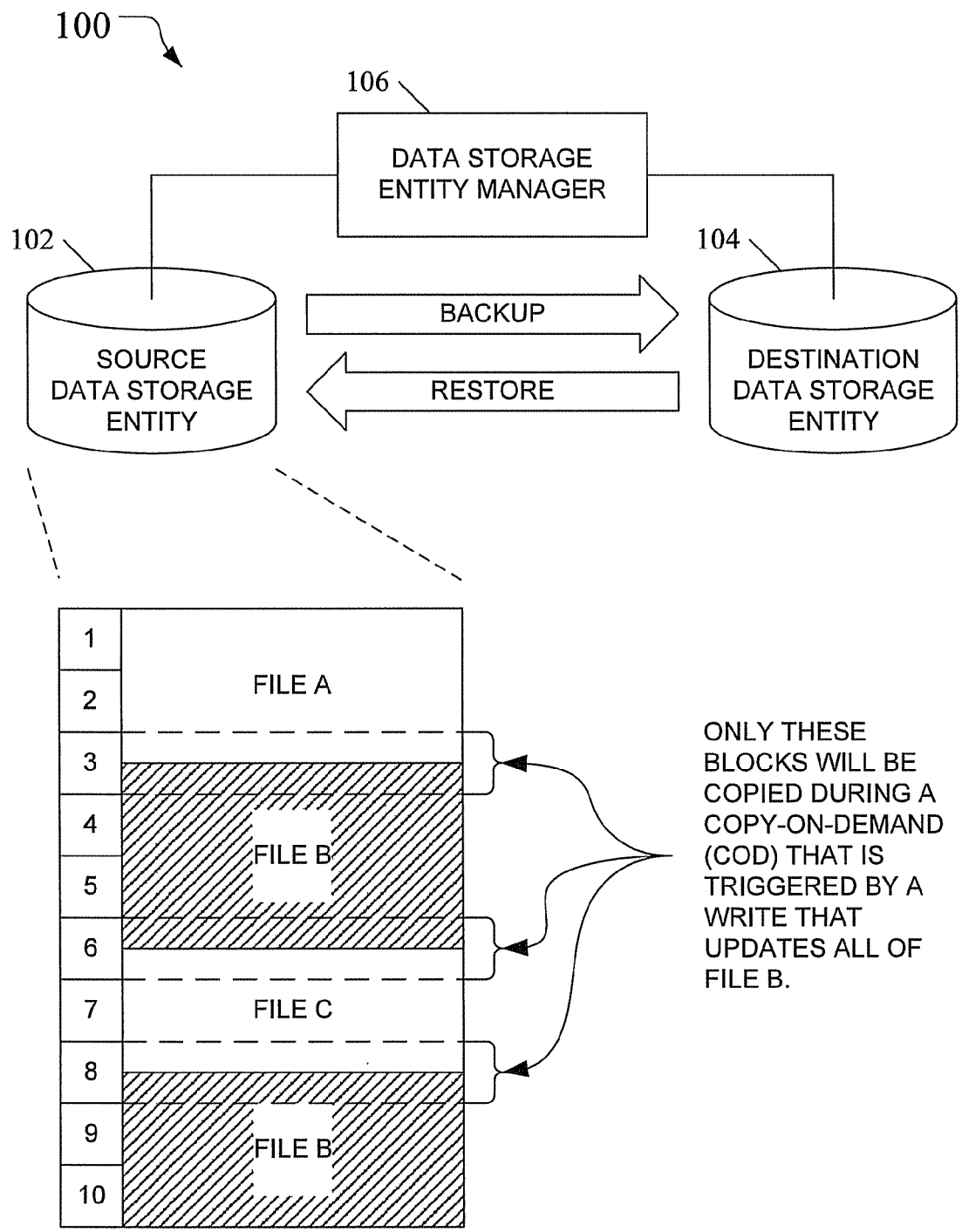
FIG. 1 is a block diagram illustrating an exemplary system for copy-on-demand optimization for large writes according to an embodiment of the subject matter described herein.

FIG. 1 is a block diagram illustrating an exemplary system for copy-on-demand optimization for large writes according to an embodiment of the subject matter described herein. Referring to FIG. 1, system 100 includes a source data storage entity (source) 102, a destination storage entity (destination) 104, and a data storage entity manager (manager) 106 for managing the source and destination data storage entities. Manager 106 is configured to: receive a write request to write data to a target portion of source 102, where the target portion of source 102 includes at least one data storage block. Manager 106 determines whether source 102 and destination 104 are engaged in a backup operation which includes copying data from destination 104 to source 102 sufficient to synchronize source 102 to destination 104. If so, manager 106 determines whether the target portion of source 102 is not yet synchronized to destination 104. If manager 106 determines that the target portion of source 102 is not yet synchronized to destination 104, manager 106 initiates a copy-on-demand operation to synchronize source 102 to destination 104. Unlike conventional systems, which synchronize the target portion of source 102 by copying from destination 104 to source 102 all of the blocks of destination 104 that correspond to the target portion of source 102, manager 106 selectively copies blocks from destination 104 such that each data storage block within the target portion of source 102 that will be completely overwritten as a result of the write request is not synchronized to (i.e., copied from) destination 104.

In one implementation, source and destination storage entities 102 and 104 may each be disk arrays or disks within the same disk array. For example, source data storage entity 102 may be a disk in a RAID array and destination storage entity 104 may be a disk in the same or a different RAID array. Data storage entity manager 106 may be implemented in hardware or software associated with a disk array. In one exemplary implementation, data storage entity manager 106 may be implemented in software executed on a processor of a disk array.

In the embodiment illustrated in FIG. 1, source 102 contains ten blocks, numbered 1 through 10, which collectively store data associated with three files, respectively named FILE A, FILE B, and FILE C. FILE A occupies all of blocks 1 and 2 and a portion of block 3. FILE B occupies a portion of block 3, all of blocks 4 and 5, a portion of blocks 6 and 8, and all of blocks 9 and 10. FILE C occupies a portion of block 6, all of block 7, and a portion of block 8.

Figure 2:
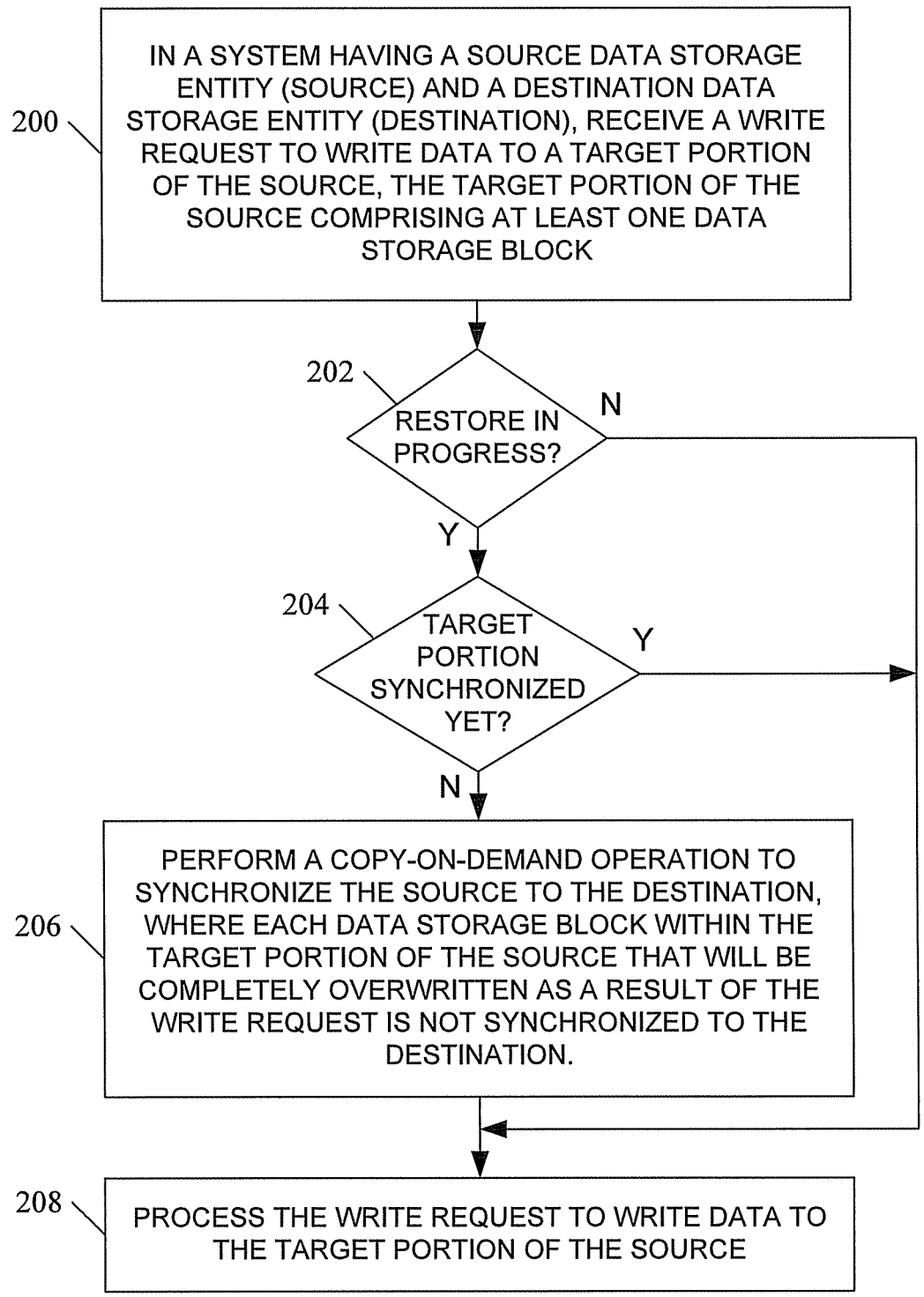
FIG. 2 is a flow chart illustrating an exemplary process for copy-on-demand optimization for large writes according to an embodiment of the subject matter described herein.

FIG. 2 is a flow chart illustrating an exemplary process for copy-on-demand optimization for large writes according to an embodiment of the subject matter described herein. This process will be described with reference to FIGS. 1 and 2.

Referring to FIG. 2, at step 200, a system having a source data storage entity and a destination data storage entity receives a write request to write data to a target portion of the source. The target portion of the source includes one or more data storage blocks. In one embodiment, manager 106 may receive a write request to write data to a target portion of source 102.

At step 202, it is determined whether the source and destination are engaged in a restore operation. A restore operation is an operation which includes copying data from the destination to the source sufficient to synchronize the source to the destination. In one embodiment, manager 106 may determine whether source 102 and destination 104 are engaged in a protected restore operation. If not, the process flow moves to step 208, described below. If source 102 and destination 104 are engaged in a restore operation, the process flow moves to step 204.

At step 204, responsive to a determination that the source and destination are engaged in a backup operation, it is determined whether the target portion of the source has already been synchronized to the destination. In one embodiment, manager 106 may determine whether the target portion of source 102 has already be synchronized to the destination, i.e., the target portion of source 102 has already been restored from (copied from) the corresponding portion of destination 104. If the target portion of source 102 has already been synchronized, the process flow moves to step 208, described below. If not, the process flow moves to step 206.

At step 206, responsive to a determination that the target portion of the source is not yet synchronized to the destination, a copy-on-demand operation is initiated to synchronize the source to the destination, where each data storage block within the target portion of the source that will be completely overwritten as a result of the write request is not synchronized to the destination. In one embodiment, manager 106 may determine that the target portion of source 102 has not yet been restored from destination 104 and therefore perform or initiate a copy-on-demand operation to restore the target portion of source 102 from the corresponding portion of destination 104. Blocks of the target portion of the source that will be completely overwritten by the received write request, however, are not copied from destination 104 to source 102. By excluding these blocks from the copy-on-demand process, the number of blocks that must be copied from destination 104 to source 102 may be greatly reduced, resulting in faster COD time and use of less resources along with a resulting reduction of power consumption and wear.

At step 208, the write request to write data to the target portion of the source is processed. In one embodiment, manager 106 may process the write request that was received at step 200, above. As a result of processing this write request, new data will be written to source 102. If source 102 and destination 104 are engaged in a protected restore, the contents of destination 104 will not be affected by the processed write.

Figure 3:
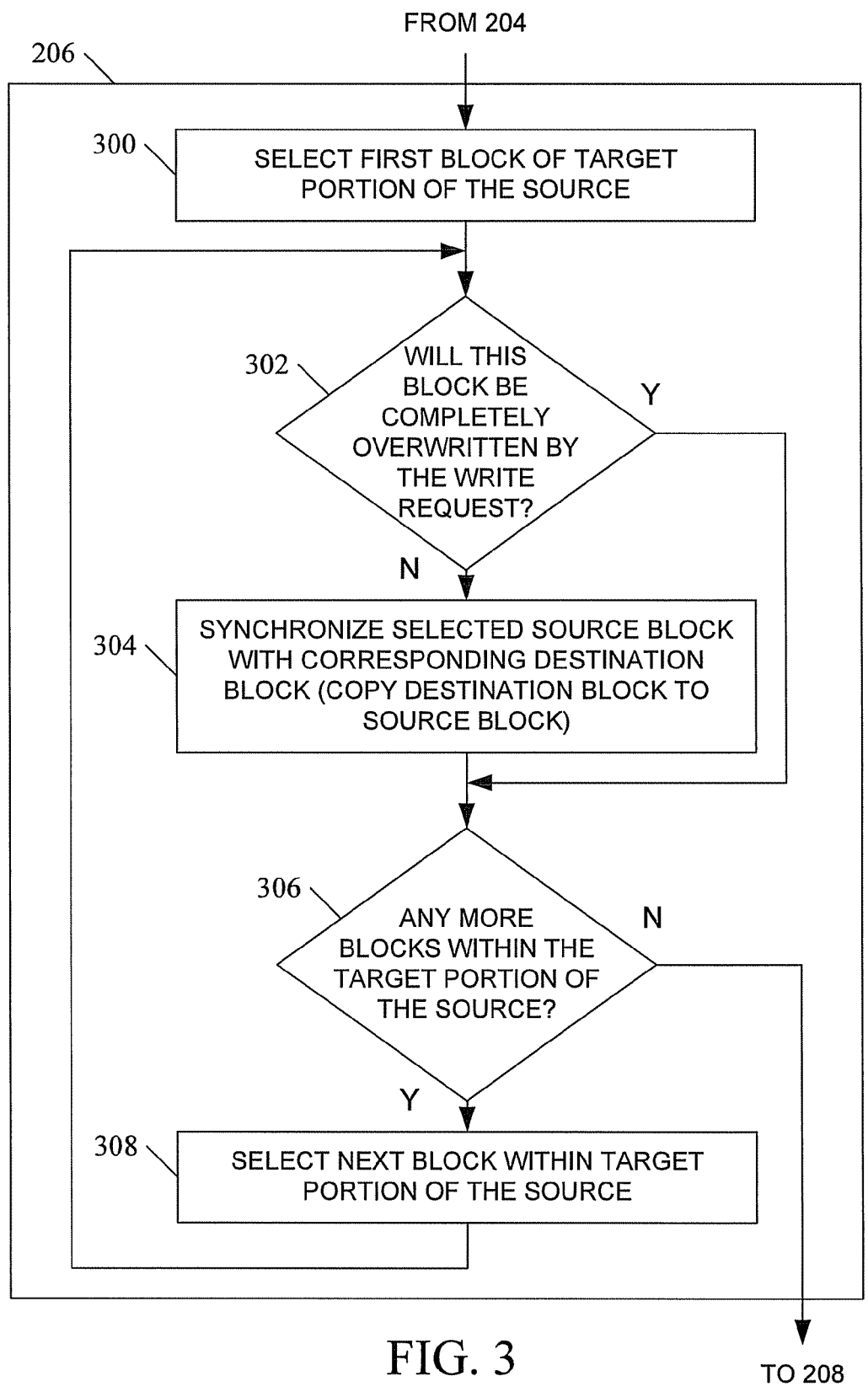
FIG. 3 is a flow chart illustrating in more detail a step of an exemplary process for copy-on-demand optimization for large writes according to an embodiment of the subject matter described herein.

FIG. 3 is a flow chart illustrating step 206 in more detail according to an embodiment of the subject matter described herein. This process will be described with reference to FIGS. 1 and 3. For the purposes of explanation and illustration, it will be assumed that source 102 and destination 104 are engaged in a protected recovery operation in which data is being copied from destination 104 to source 102, and that the data associated with FILE B, i.e., the data stored in blocks 3, 4, 5, 6, 8, 9, and 10, has not been restored yet. In this example, it will also be assumed that system 100 has received a request for a write operation that will completely update the contents of FILE B. Thus, the target portion of source 102 comprises blocks 3-6 and 8-10.

Referring to FIG. 3, at step 300, a first block of the target portion of the source is selected. In one embodiment, manager 106 selects block 3. At step 302, it is determined whether this block will be completely overwritten by the write request. For example, manager 106 determines that block 3 is shared by two files, FILE A and FILE B. Because of this, not all of block 3 will be overwritten by the write request, but only the portion of block 3 that is occupied by FILE B. The portion occupied by FILE A will not change. Since this block will not be completely overwritten by the write request, the process moves to step 304, which synchronizes the selected source block with the corresponding destination block, i.e., block 3 of source 102 is overwritten with data from the corresponding block of destination 104.

If source 102 and destination 104 are exact duplicates of each other, in which block 1 of source 102 corresponds to block 1 of destination 104, block 2 of source 102 corresponds to block 2 of destination 104, and so on, then in this example, block 3 of destination 104 will be copied to block 3 of source 102, overwriting its current contents. In alternative embodiments, however, source 102 and destination 104 may store file data in different blocks. For example, the first block of FILE B may be stored in block 3 of source 102 but in block 12 of destination 104, in which case manager 106 must maintain a map or other means to associate each block in source 102 with its corresponding block in destination 104. Using this example, regardless of where the corresponding block is located in destination 104, the data in that corresponding block will be copied to block 3 of source.

At step 306, it is determined whether there are any more blocks within the target portion of the source. For example, manager 106 will check to see if FILE B occupies any blocks other than block 3. In the embodiment illustrated in FIG. 1, manager 106 determines that FILE B also occupies block 4 on source 102, and the process moves to step 308.

At step 308, the next block within the target portion of source 102 is selected, which in this example is block 4, and the process returns to block 302. This time, however, manager 106 determines that block 4 will be completely overwritten by the write request, since block 4 is occupied only by FILE B, and so the process flow skips the synchronize step 304 and goes directly to step 306. By avoiding step 304, manager 106 avoids writing a block of source 102 (e.g., block 4), that will just be completely overwritten again by the write request. For large writes, this may result in significant savings of time, energy, and resources.

Continuing through the process would, in this example, result in a copy-on-demand of blocks 3, 6, and 8, while blocks 4, 5, 9, and 10 would not be copied from destination 104 to source 102. At the conclusion of step 206, the process would go to step 208, and the write request would be processed, overwriting portions of blocks 3, 6, and 8 and all of blocks 4, 5, 9, and 10.

In one embodiment, manager 106 receives only write requests that are directed to contiguous blocks. For example, in order to update all of FILE B, manager 106 may receive two separate write requests, a first request to write blocks 3-6, and a second request to write blocks 8-10. In this embodiment, the process of step 206 may be simplified by performing a COD operation on only the first and last blocks of the set of contiguous blocks. For example, manager 106 may perform a COD for blocks 3 and 6 for the first write, and perform a COD for blocks 8 and 10 of the second write. Although this simplification may be less efficient than the process illustrated in FIG. 3 (e.g., the simplified process performed a COD on block 10 even though it wasn't necessary), the ease of implementation may outweigh the slight loss of efficiency.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for copy on demand optimization for large writes, the method comprising:
    in a system having a source data storage entity and a destination data storage entity:
    receiving a write request to write data to a target portion of the source data storage entity, the target portion of the source data storage entity comprising a plurality of data storage blocks;
    determining whether the source data storage entity and the destination data storage entity are engaged in a restore operation which includes copying data from the destination data storage entity to the source data storage entity sufficient to synchronize the source data storage entity to the destination data storage entity;
    responsive to a determination that the source data storage entity and the destination data storage entity are engaged in a restore operation, determining whether the target portion of the source data storage entity is not yet synchronized to the destination data storage entity;
    responsive to a determination that the target portion of the source data storage entity is not yet synchronized to the destination data storage entity, performing a copy-on-demand operation to synchronize the target portion of the source data storage entity to the destination data storage entity, wherein performing the copy-on-demand operation comprises:
    determining, for each data storage block within the target portion of the source data storage entity, whether the data storage block will be completely overwritten as a result of the write request;
    synchronizing the target portion of the source data storage entity to the destination data storage entity so that each data storage block within the target portion of the source data storage entity that will be completely overwritten as a result of the write request is not synchronized to the destination data storage entity as part of the restore operation;
    receiving a read from the source data storage entity during the restore operation and guaranteeing the read to return data as it will exist after the restore operation is completed; and
    processing the write request to write data to the target portion of the source data storage entity.

2. The method of claim 1 wherein the restore operation comprises a protected restore operation wherein changes to the source data storage entity that occur during the restore operation are not reflected to the destination data storage entity until after the restore operation is completed.

3. The method of claim 1 wherein at least one of the source data storage entity and the destination data storage entity comprises a disk storage entity.

4. The method of claim 1 wherein at least one of the source data storage entity and the destination data storage entity comprises a disk storage entity in a redundant array of inexpensive disks (RAID) configuration.

5. The method of claim 1 wherein the source data storage entity and the destination data storage entity are located on a same disk array.

6. The method of claim 1 wherein the source data storage entity and the destination data storage entity are located on different disk arrays.

7. A system for copy on demand optimization for large writes, the system comprising:
    a source data storage entity;
    a destination data storage entity; and
    a data storage entity manager, implemented using a processor of a computer, for managing the source and destination data storage entities, wherein the data storage entity manager is configured to:
    receive a write request to write data to a target portion of the source data storage entity, the target portion of the source data storage entity comprising a plurality of data storage blocks;
    determining whether the source data storage entity and the destination data storage entity are engaged in a restore operation which includes copying data from the destination data storage entity to the source data storage entity sufficient to synchronize the source data storage entity to the destination data storage entity;
    responsive to a determination that the source data storage entity and the destination data storage entity are engaged in a restore operation, determine whether the target portion of the source data storage entity is not yet synchronized to the destination data storage entity;
    responsive to a determination that the target portion of the source data storage entity is not yet synchronized to the destination data storage entity, perform a copy-on-demand operation to synchronize the target portion of the source data storage entity to the destination data storage entity, wherein performing the copy-on-demand operation comprises:
    determining, for each data storage block within the target portion of the source data storage entity, whether the data storage block will be completely overwritten as a result of the write request;
    synchronizing the target portion of the source data storage entity to the destination data storage entity so that each data storage block within the target portion of the source data storage entity that will be completely overwritten as a result of the write request is not synchronized to the destination data storage entity as part of the restore operation;
    receive a read from the source data storage entity during the restore operation and guaranteeing the read to return data as it will exist after the restore operation is completed; and
    process the write request to write data to the target portion of the source data storage entity.

8. The system of claim 7 wherein the restore operation comprises a protected restore operation wherein changes to the source data storage entity that occur during the restore operation are not reflected to the destination data storage entity until after the restore operation is completed.

9. The system of claim 7 wherein at least one of the source data storage entity and the destination data storage entity comprises a disk storage entity.

10. The system of claim 7 wherein at least one of the source data storage entity and the destination data storage entity comprises a disk storage entity in a redundant array of inexpensive disks (RAID) configuration.

11. The system of claim 7 wherein the source data storage entity and the destination data storage entity are located on a same disk array.

12. The system of claim 7 wherein the source data storage entity and the destination data storage entity are located on different disk arrays.

13. A non-transitory computer readable medium having stored thereon executable instructions that when executed by the processor of a computer control the computer to perform steps comprising:

in a system having a source data storage entity and a destination data storage entity:

receiving a write request to write data to a target portion of the source data storage entity, the target portion of the source data storage entity comprising a plurality of data storage blocks;

determining whether the source data storage entity and the destination data storage entity are engaged in a restore operation which includes copying data from the destination data storage entity to the source data storage entity sufficient to synchronize the source data storage entity to the destination data storage entity;

responsive to a determination that the source data storage entity and the destination data storage entity are engaged in a restore operation, determining whether the target portion of the source data storage entity is not yet synchronized to the destination data storage entity;

responsive to a determination that the target portion of the source data storage entity is not yet synchronized to the destination data storage entity, performing a copy-on-demand operation to synchronize the target portion of the source data storage entity to the destination data storage entity, wherein performing the copy-on-demand operation comprises:

determining, for each data storage block within the target portion of the source data storage entity, whether the data storage block will be completely overwritten as a result of the write request;

synchronizing the target portion of the source data storage entity to the destination data storage entity so that each data storage block within the target portion of the source data storage entity that will be completely overwritten as a result of the write request is not synchronized to the destination data storage entity as part of the restore operation;

receive a read from the source data storage entity during the restore operation and guaranteeing the read to return data as it will exist after the restore operation is completed; and processing the write request to write data to the target portion of the source data storage entity.

14. The computer readable medium of claim 13 wherein the restore operation comprises a protected restore operation wherein changes to the source data storage entity that occur during the restore operation are not reflected to the destination data storage entity until after the restore operation is completed.

15. The computer readable medium of claim 13 wherein at least one of the source data storage entity and the destination data storage entity comprises a disk storage entity.

16. The computer readable medium of claim 13 wherein at least one of the source data storage entity and the destination data storage entity comprises a disk storage entity in a redundant array of inexpensive disks (RAID) configuration.

17. The computer readable medium of claim 13 wherein the source data storage entity and the destination data storage entity are located on a same disk array.

18. The computer readable medium of claim 13 wherein the source data storage entity and the destination data storage entity are located on different disk arrays.

* * * * *